(12) United States Patent
Lin

(10) Patent No.: US 7,390,237 B2
(45) Date of Patent: Jun. 24, 2008

(54) LEARNING TOY

(76) Inventor: Wen-Pin Lin, No. 30, Chien-Yung Street, Tung District, Taichung City (TW)

( * ) Notice: Subject to any disclaimer, the term of this patent is extended or adjusted under 35 U.S.C. 154(b) by 237 days.

(21) Appl. No.: 11/044,918

(22) Filed: Jan. 26, 2005

(65) Prior Publication Data
US 2005/0227573 A1  Oct. 13, 2005

(51) Int. Cl.
*A63H 33/06* (2006.01)
(52) U.S. Cl. .................... 446/118; 446/147; 273/282.1; 273/287; 434/81; 434/96
(58) Field of Classification Search ................ 446/118, 446/128, 147–152; 273/282.1, 282.3, 284, 273/276, 287; 434/81, 83, 96, 98
See application file for complete search history.

(56) References Cited

U.S. PATENT DOCUMENTS

| | | | | |
|---|---|---|---|---|
| 2,961,786 A | * | 11/1960 | Lowmaster | 40/606.14 |
| 3,175,825 A | | 3/1965 | Ehret | |
| 3,594,940 A | * | 7/1971 | Yonezawa | 446/118 |
| 3,845,590 A | * | 11/1974 | Ertl | 52/27.5 |
| 4,183,167 A | * | 1/1980 | Jatich | 446/118 |
| 4,488,034 A | * | 12/1984 | Stephens et al. | 235/50 A |
| 4,536,980 A | * | 8/1985 | Fleming | 40/427 |
| 4,986,756 A | * | 1/1991 | Yamaguchi | 434/96 |
| 4,993,984 A | | 2/1991 | Matarese | |
| 6,378,232 B1 | * | 4/2002 | Creech | 40/606.15 |

FOREIGN PATENT DOCUMENTS

| FR | 1 091 109 A | 4/1955 |
|---|---|---|
| FR | 1 576 436 A | 8/1969 |
| FR | 2 570 612 A | 3/1986 |

* cited by examiner

*Primary Examiner*—Gene Kim
*Assistant Examiner*—Urszula M Cegielnik
(74) *Attorney, Agent, or Firm*—Townsend and Townsend and Crew, LLP

(57) ABSTRACT

A learning toy includes a board assembly having a plurality of perforations, and at least one toy element provided with a stud member for insertion into one of the perforations so as to attach the toy element onto the board assembly. The board assembly includes a base and a face panel removably superposed on the base, the base being formed with a plurality of perforations extending through the thickness of the base, and the face panel being formed with a plurality of perforations respectively aligned with the perforations of the base. A plurality of toy elements may be provided, the heads of the toy elements being embodied in various forms and configurations so that a variety of games may be played on the board assembly.

3 Claims, 15 Drawing Sheets ly aligned with the perforations of the base, and a plurality of toy
LEARNING TOY

BACKGROUND OF THE INVENTION

1. Field of the Invention

The present invention relates to a toy, more particularly to a learning toy for young children that provides a variety of games for playing as well as for developing learning and cognitive skills in children.

2. Description of the Related Art

With reference to FIGS. 1 and 2, a learning board unit 1 generally used in teaching young children, which mainly comprises a base 11, a transparent face panel 12, a picture card 13 and a plurality of peg elements 14 of various geometric shapes, is shown. The transparent face panel 12 is provided with a plurality of projections 122 formed on a front face 121 thereof, and two elongate channels 123 formed on the upper and lower edges of the base 11, respectively. The face panel 12 is overlaid on the base 11 by passing the face panel 12 through the left or right side of the base 11, with the upper and lower edges of the face panel 12 inserted in the two elongate channels 123, respectively. The picture card 13 is placed between the base 11 and the face panel 12. The plurality of peg elements 14 are each formed with a recess 142 on one side 141 thereof into which the projection 122 may be fitted in engagement. With the board unit 1 thus assembled, a child may, according to the color, drawing or word(s) shown on the picture card 13 which can be viewed through the transparent face panel 12, attach selected peg elements 14 onto the face panel 12 by fitting the projections 122 in corresponding recesses 142 of the selected peg elements 14 to form a combination which corresponds to the color, drawing or word(s) shown on the picture card 13, or to form a unique and meaningful pattern independent of that shown in the picture 13.

According to the construction described above, the face panel 12 and the picture card 13 are assembled to and disassembled from the base 11 by inserting or withdrawing the same from the elongate channels 123 of the base 11. If the face panel 12 were considerably large, such inserting and withdrawing operations would evidently be quite difficult and require considerable effort. Moreover, because the peg elements 14 are attached onto the face panel 12 by fitting the projections 122 on the face panel 12 into the respective recesses 142 of the peg elements 14, the stability of the connection will be affected if the depth of connection is limited. Therefore, the face panel 12 is suitable only for attachment of lightweight and small peg elements 14 thereon. In terms of the teaching function, the board unit 1 provides no more than the general function of fitting the pieces of a jigsaw puzzle on a board, in which variations are manifestly insufficient. The present invention is thus contrived in an attempt to alleviate the above shortcomings of the prior art.

SUMMARY OF THE INVENTION

Therefore, a main object of the present invention is to provide a learning toy for children in which toy elements can be stably and firmly attached onto a board assembly.

Another object of the present invention is to provide a toy-game kit in which a variety of games for playing as well as for developing learning and cognitive skills of children are incorporated therein.

Accordingly, the learning toy according to the present invention comprises a board assembly having a plurality of perforations, and at least one toy element provided with a stud member for insertion into one of the perforations so as to attach the toy element onto the board assembly. In the preferred embodiments, the board assembly includes a base and a face panel removably superposed on the base, the base being provided with a plurality of perforations and the face panel being provided with a plurality of perforations respectively aligned with the perforations of the base, and a plurality of toy elements each having a head and a stud member connected to the head are provided, the heads being of various forms and configurations for attachment onto the board assembly to form a combination corresponding to a pattern, or to provide various games for playing.

In a further aspect, the present invention provides a toy-game kit which includes the board assembly and the plurality of toy elements described above.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENT

Figure 1:
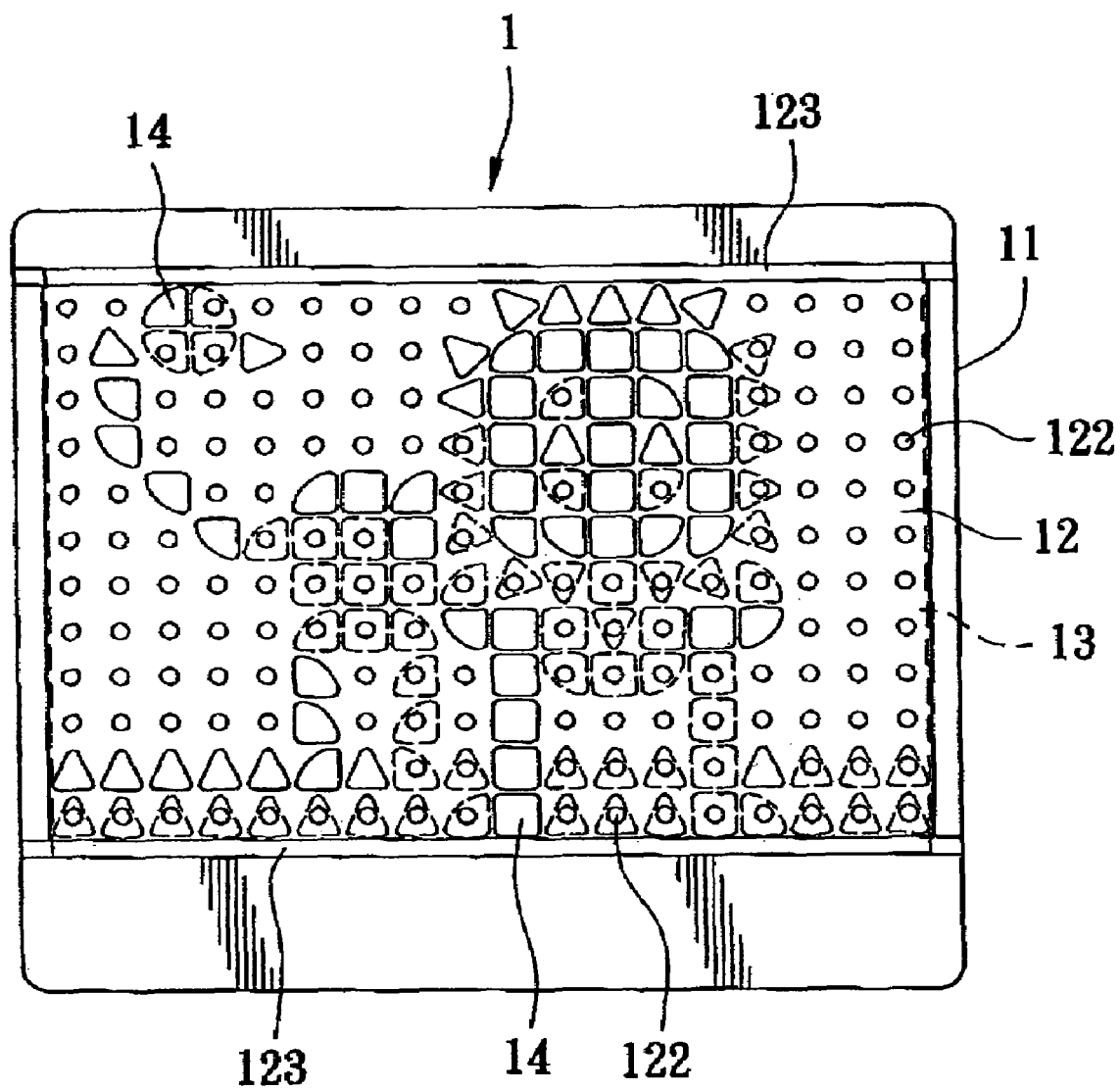
FIG. 1 is a plan view illustrating a conventional learning board unit.
Figure 2:
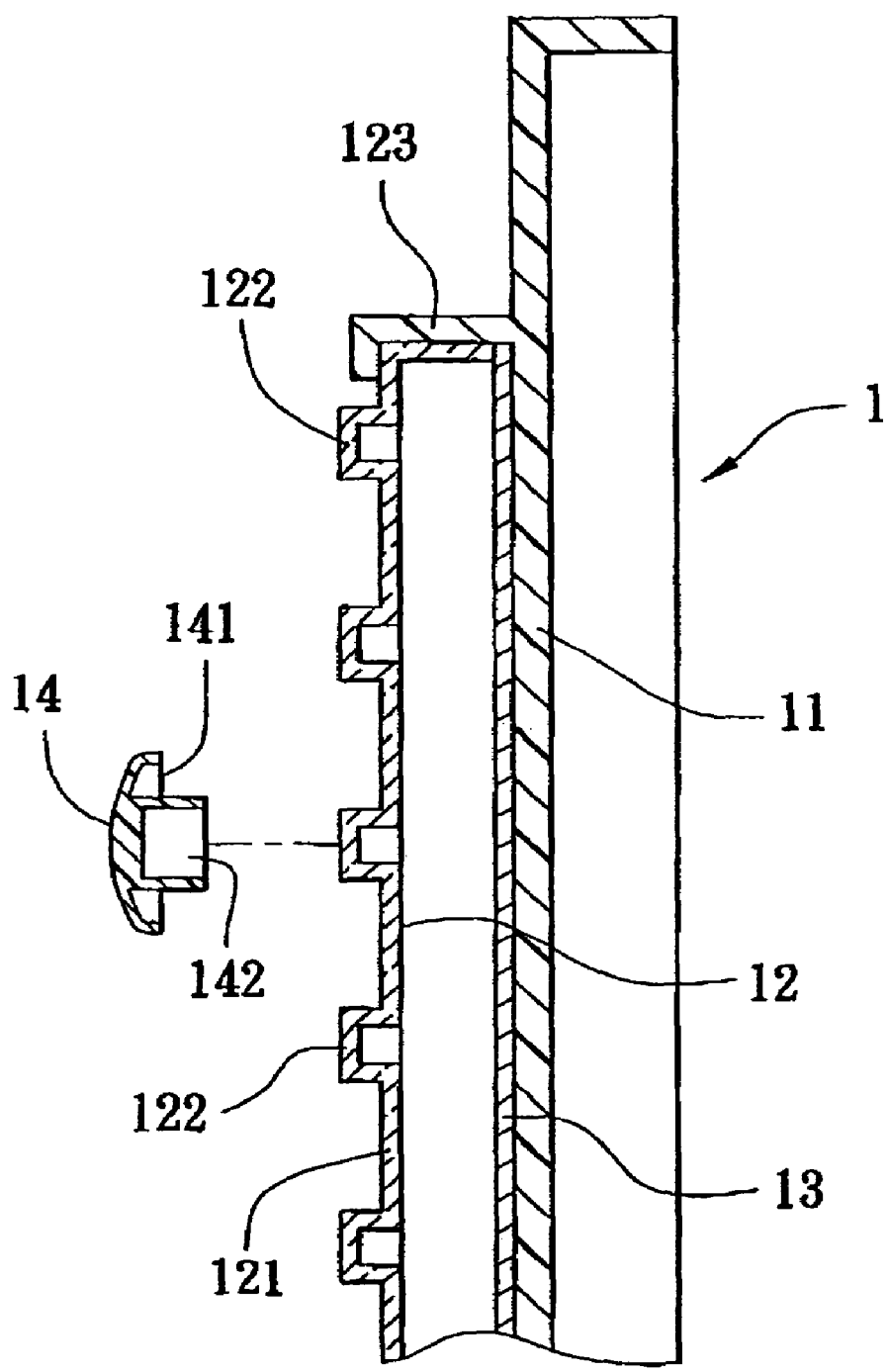
FIG. 2 is a sectional view showing the attachment of a peg element onto the conventional learning board unit.
Figure 3:
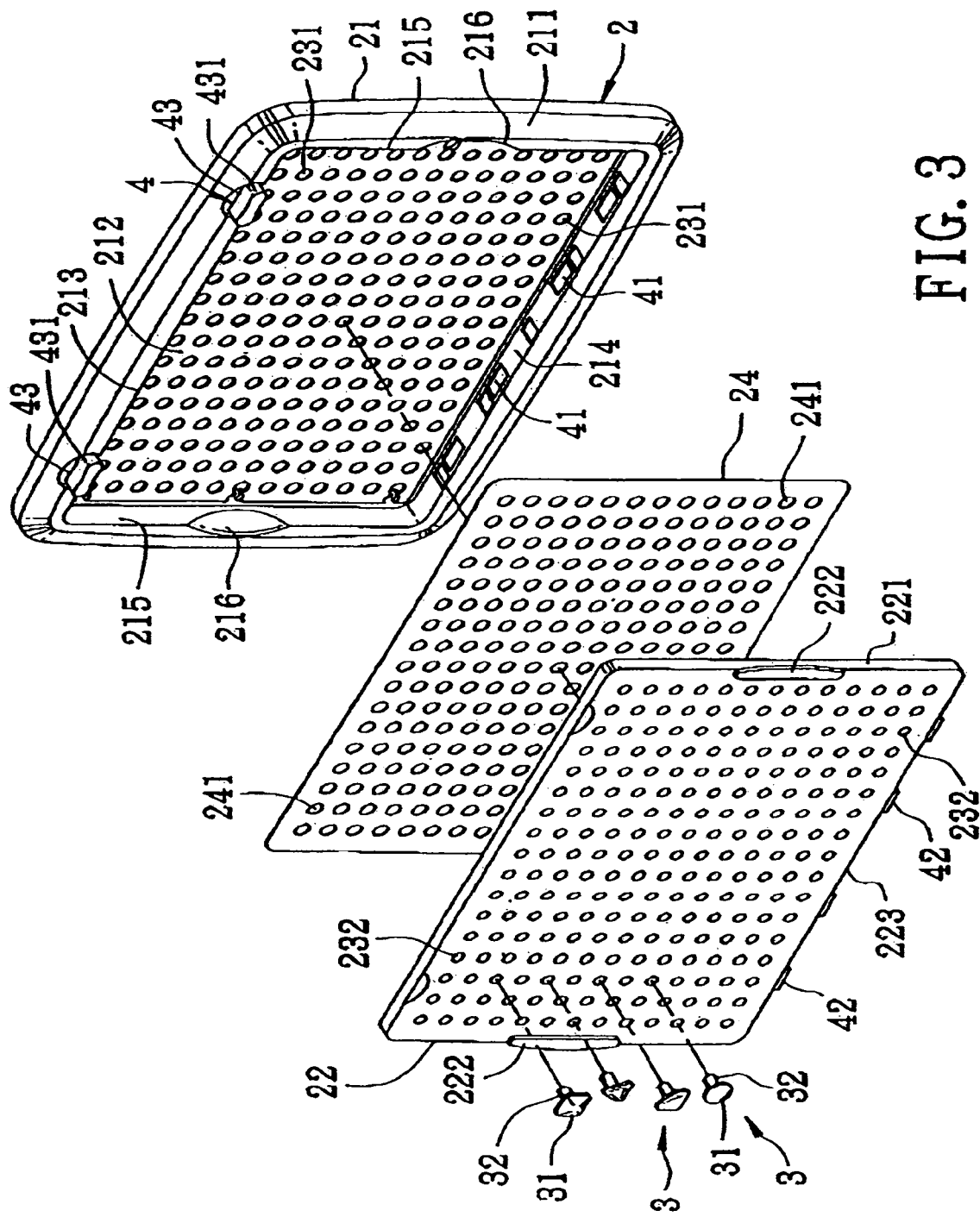
FIG. 3 is an exploded, perspective view of a first preferred embodiment of the learning toy according to the present invention.
Figure 4:
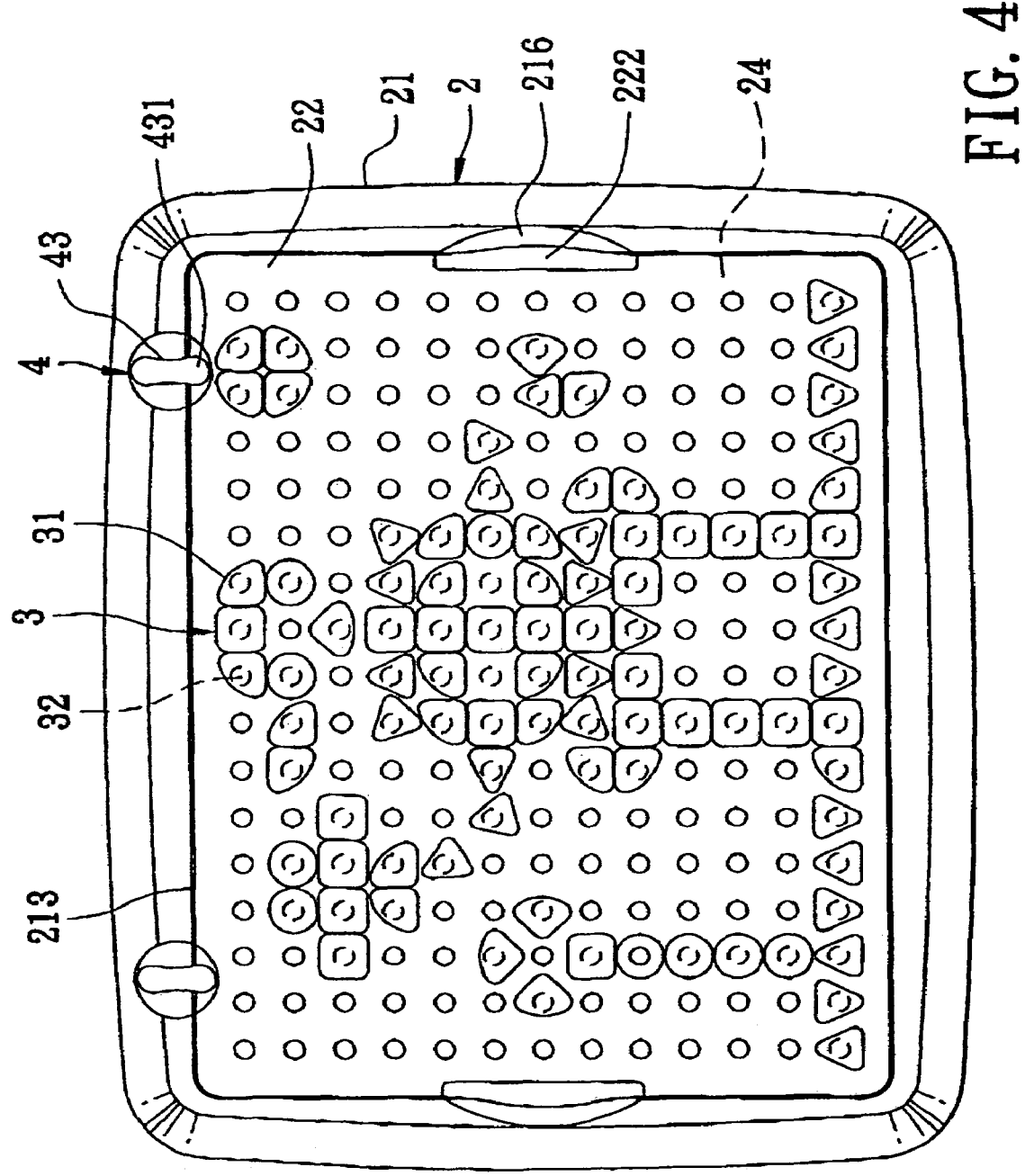
FIG. 4 is a plan view of the first preferred embodiment showing the assembled state of the board assembly in the first preferred embodiment, with the toy elements attached thereon.
Figure 5:
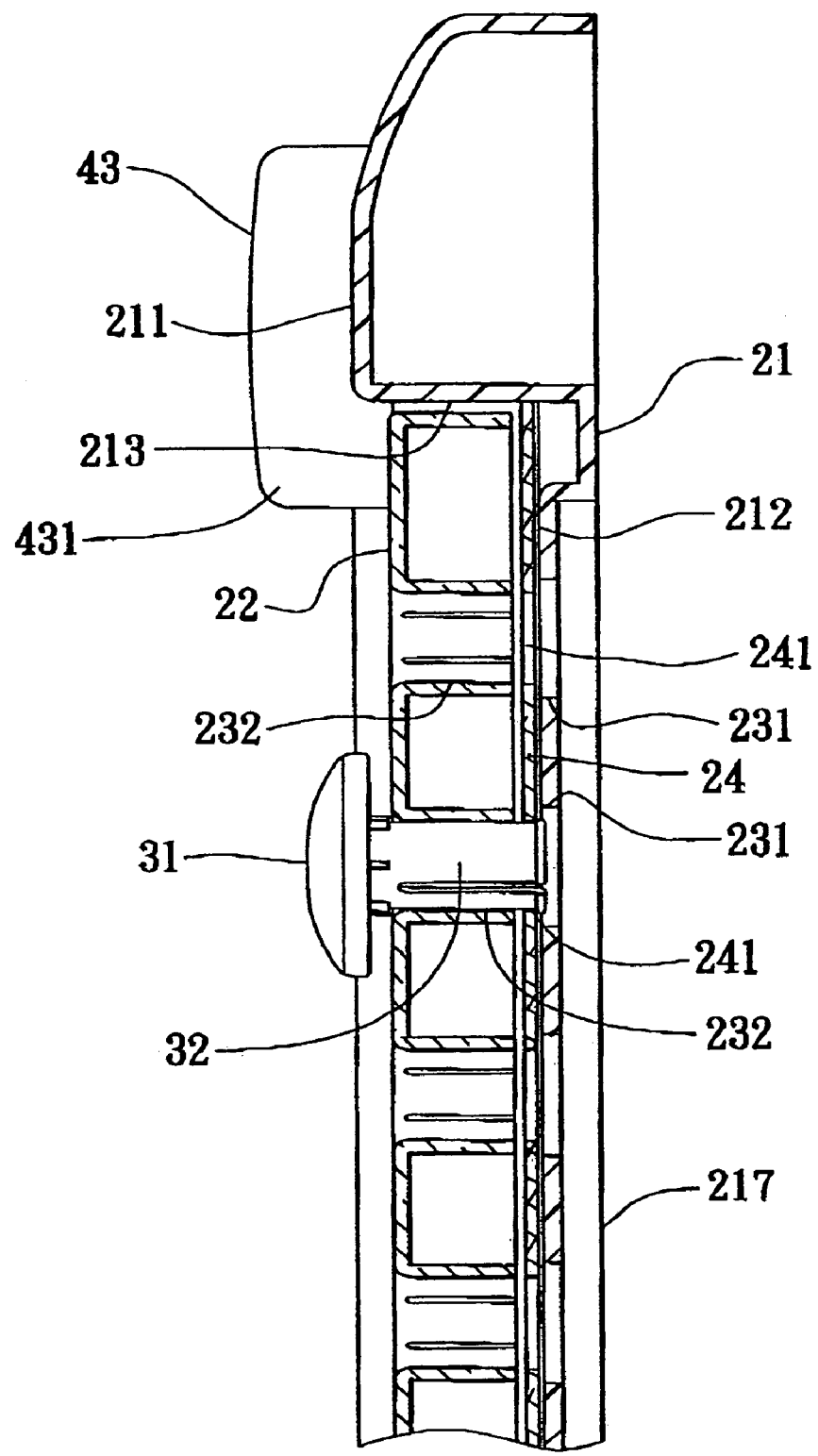
FIG. 5 is a sectional view of the first preferred embodiment, showing the attachment of a toy element onto the board assembly.

A first preferred embodiment of the learning toy according to the present invention is shown in FIGS. 3, 4 and 5. The learning toy generally comprises a board assembly 2 having a plurality of perforations 231,232, a plurality of toy elements 3 each provided with a stud member 32 for insertion into the perforations 232,241,231 so as to attach the toy elements onto the board assembly 2, and a positioning unit 4.

In the first preferred embodiment shown, the board assembly 2 includes a base 21 provided with a plurality of perforations 231 formed through the thickness of the base 21 and a transparent face panel 22 removably superposed on the base 21 and provided with a plurality of perforations 232 which are aligned with the perforations 231 of the base 2 (see FIG. 5). A plurality of pattern cards 24 (only one of which is shown) which may be placed one at a time between the base 21 and the face panel 22 are further provided. Each of the pattern cards 24 is formed with a plurality of perforations 241 which are aligned with the perforations 231,232 of the base 2 and of the face panel 22, and is designed with a colored drawing, a picture, a pattern, or word(s) thereon (not shown), which can be viewed through the transparent face panel 22.

The base 21 has a front side 211 formed with a recessed portion 212 for receiving the face panel 22 and one of pattern cards 24 selected, and a back side 217. The recessed portion 212 is defined by a pair of opposed first walls 213, 214 and a pair of opposed second walls 215, and two notched portions 216 are formed respectively on the pair of opposed second walls 215.

The face panel 22 has two opposed sides 221 each formed with a lug 222 projecting into one of the notched portions 216 when the face panel 21 is assembled with the base 21. A user may insert a finger into the notched portion 216 of the base 21 and grip the lug 222 therein, thus making it convenient for the user to hold the face panel 22.

The positioning unit 4 includes a plurality of slots 41 formed on one of the first walls 214, which is the lower wall, of the base 21, a plurality of projections 42 formed on a lower edge 223 of the face panel 22 for insertion into the slots 41, and two fixing members 43 rotatably mounted on the other first wall 213, which is the upper wall, of the base 21. The fixing members 43 each have a stop 431 and may be rotated such that the stop 431 projects over the face panel 22 so as to hold the face panel 22 in place with the base 21, or is moved away from the face panel 22 so that the face panel 22 can be removed from the recessed portion 212 of the base 21. Thus, to position and fix the face panel 21 onto the base 21 with a pattern card 24 interposed therebetween, the desired or selected pattern card 24 is placed in the recessed portion 212 of the base 21, then the face panel 22 is overlaid on the pattern card 24 with the projections 42 fitted into the respective slots 41 to place the face panel 22 in position, and finally the fixing members 43 are rotated until each of the stops 431 projects over the face panel 22, thereby positioning the face panel 22 and the pattern card 24 onto the base 21.

The toy elements 3 each further include a head which is connected to the stud member 32 and which is configured in different forms. In the present embodiment, the toy elements 3 each have a geometrically shaped head 31 integral with the stud member 32, the geometrically shaped heads 31 of the toy elements 3 being of such shapes as rounded, square, isosceles triangle or crescent-shape, as shown in FIGS. 3 and 4, which may be combined and fitted together to form a pattern or picture corresponding to the pattern or picture on the pattern card 24, as shown in FIG. 4. The toy elements 3 are attached onto the face panel 22 simply by inserting the stud member 32 of the selected toy element 3 into the corresponding aligned perforations 232,241,231 on the face panel 22, on the pattern card 24 and on the base 21.

Alternatively, the pattern card 24 may be eliminated, and the toy elements 3 may be freely and randomly selected and combined to form a pattern or picture as envisaged by a child player.

Figure 6:
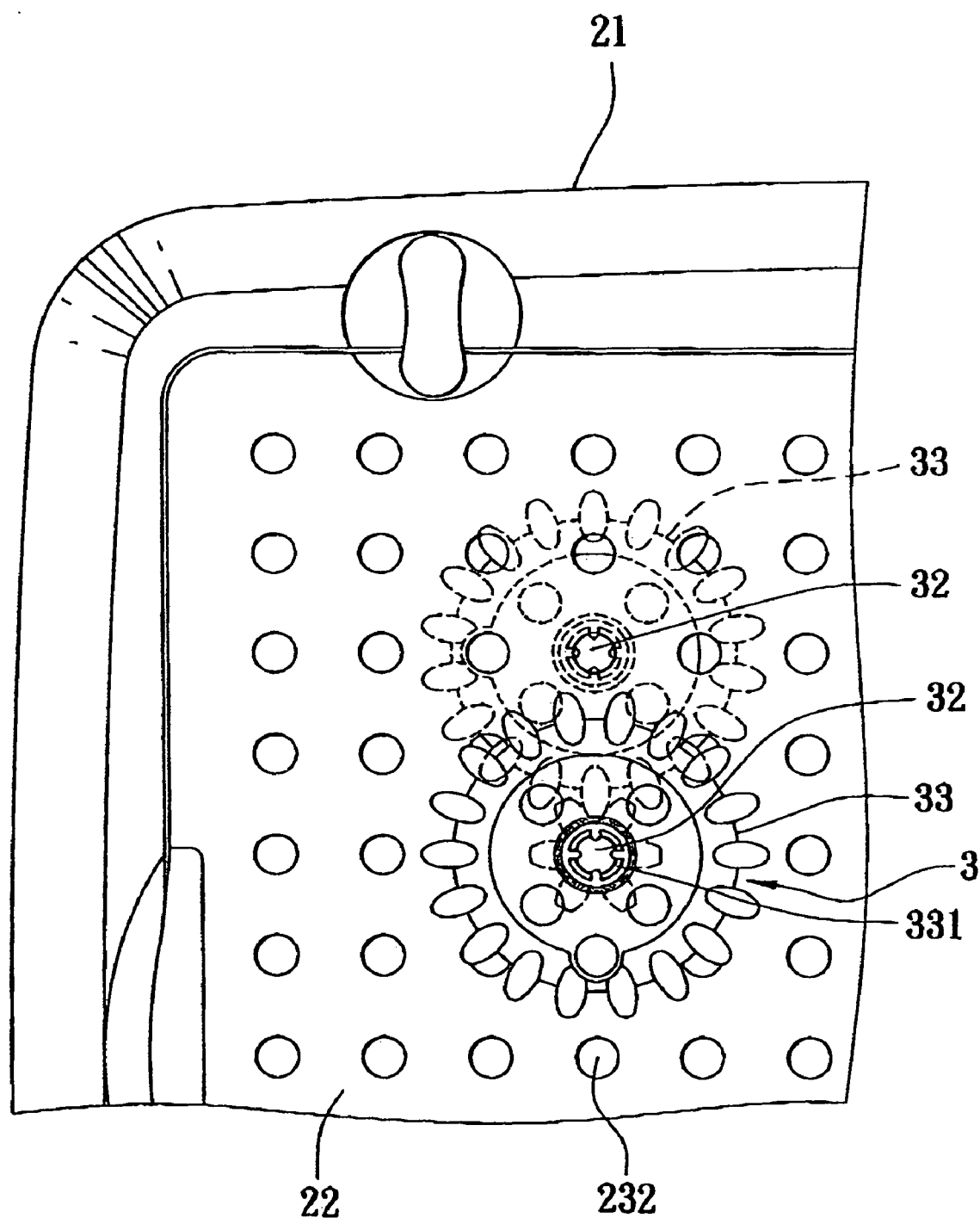
FIG. 6 is a fragmentary plan view of a second preferred embodiment of the learning toy according to the present invention, in which the head of the toy element is in the form of a toy gear.
Figure 7:
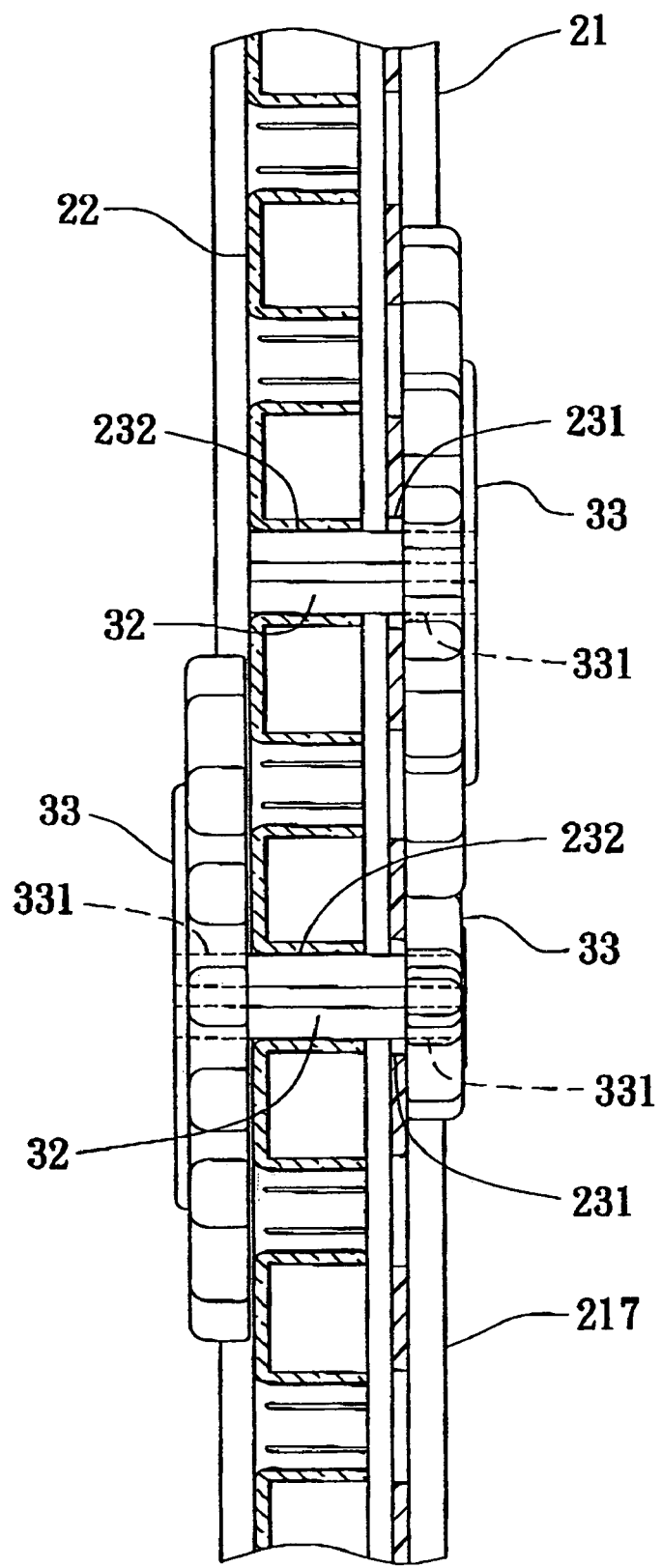
FIG. 7 is a sectional view showing the attachment of the toy gear onto both sides of the board assembly in the second preferred embodiment.
Figure 8:
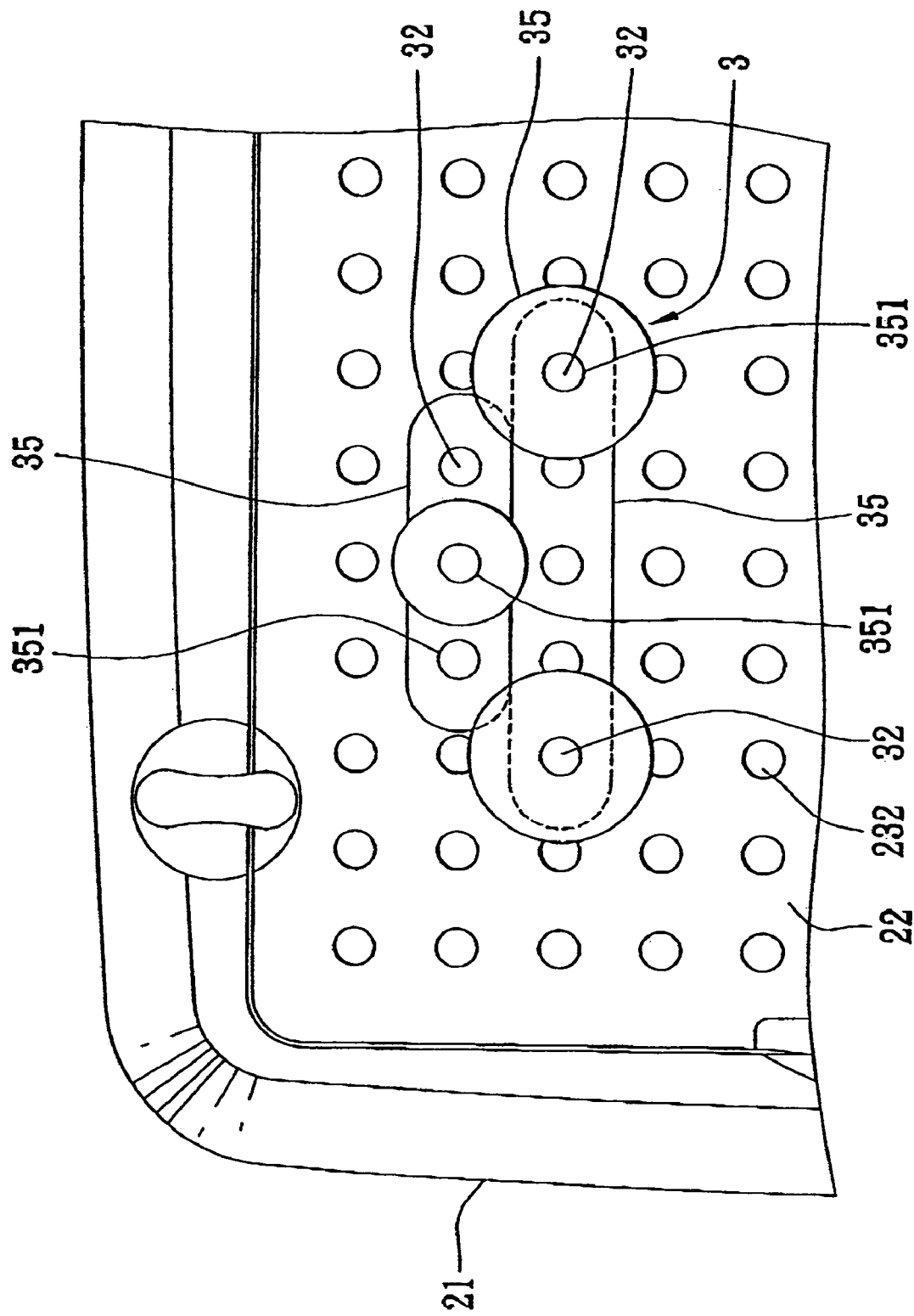
FIG. 8 is a fragmentary plan view of the second preferred embodiment, in which the head of the toy element is in the form of a toy brick.
Figure 9:
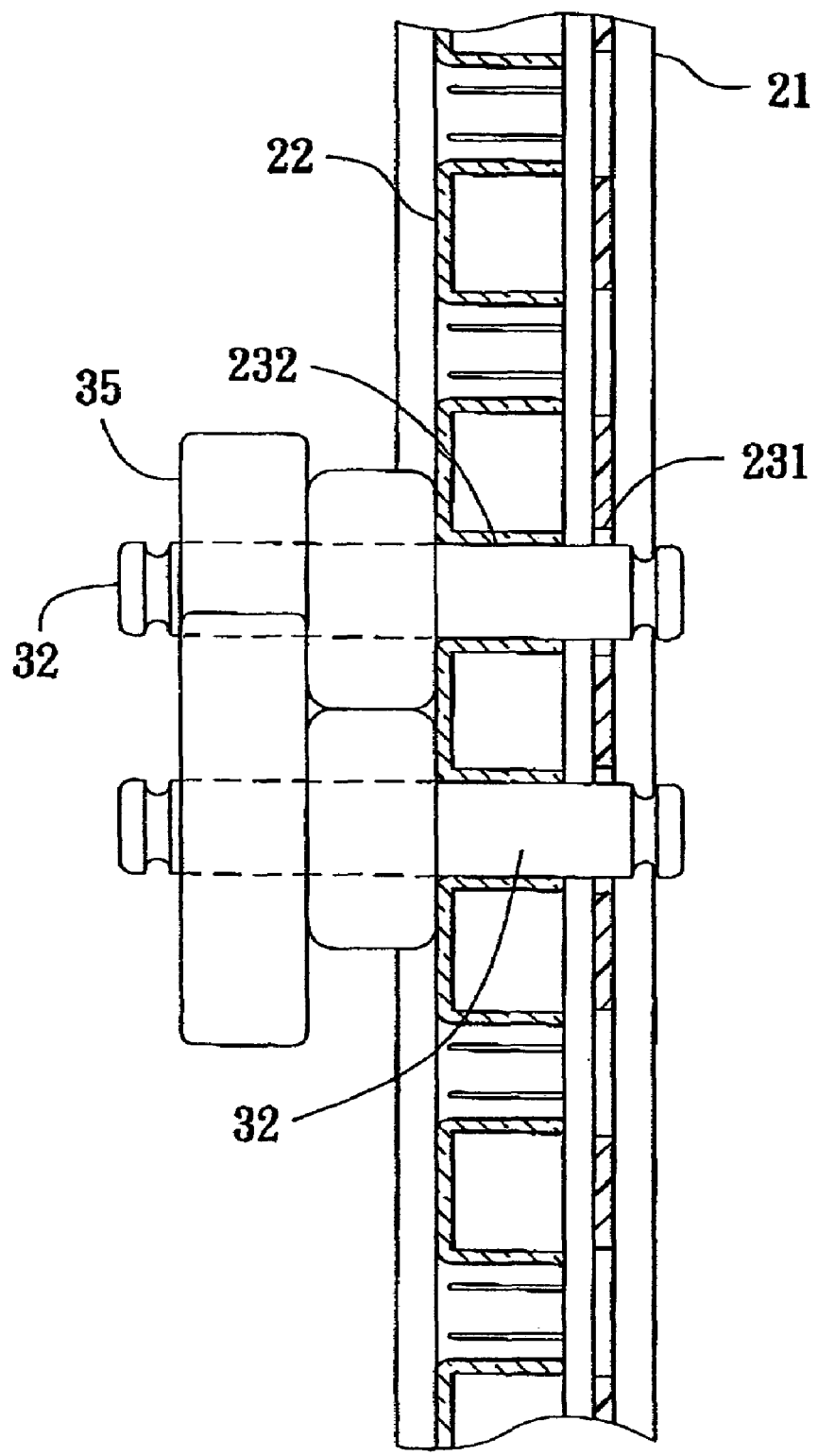
FIG. 9 is a sectional view showing the attachment of the toy brick onto the board assembly in the second preferred embodiment.

A second preferred embodiment of the learning toy is shown in FIGS. 6, 7, 8 and 9. As in the first preferred embodiment, a plurality of toy elements 3 are provided for attachment onto the board assembly 2 to form a variety of patterns. In the present embodiment, however, the pattern card 4 may be eliminated and the heads of the toy elements 3 are formed as modular toy pieces, such as toy gears 33 or toy bricks 35. As shown in FIGS. 6 and 8, the toy gears 33 and the toy bricks 35 each have a through-hole 331,351 into which the stud member 32 may be inserted to attach the toy gears 33 or toy bricks 35 onto the face panel 22. Referring to FIGS. 6 and 7, the toy gears 33 can be attached either onto the face panel 22, i.e., on the front side 211 of the base 21, or onto the rear side 217 of the base 21, and the stud members 32 for attaching the toy gears 33 may be of a circular or gear-shape cross section. As a way of playing, the toy gears 33 may arranged such that the respective teeth of adjacent toy gears 33 are in meshing engagement for transmission of the rotary motion of the toy gears 33.

Figure 10:
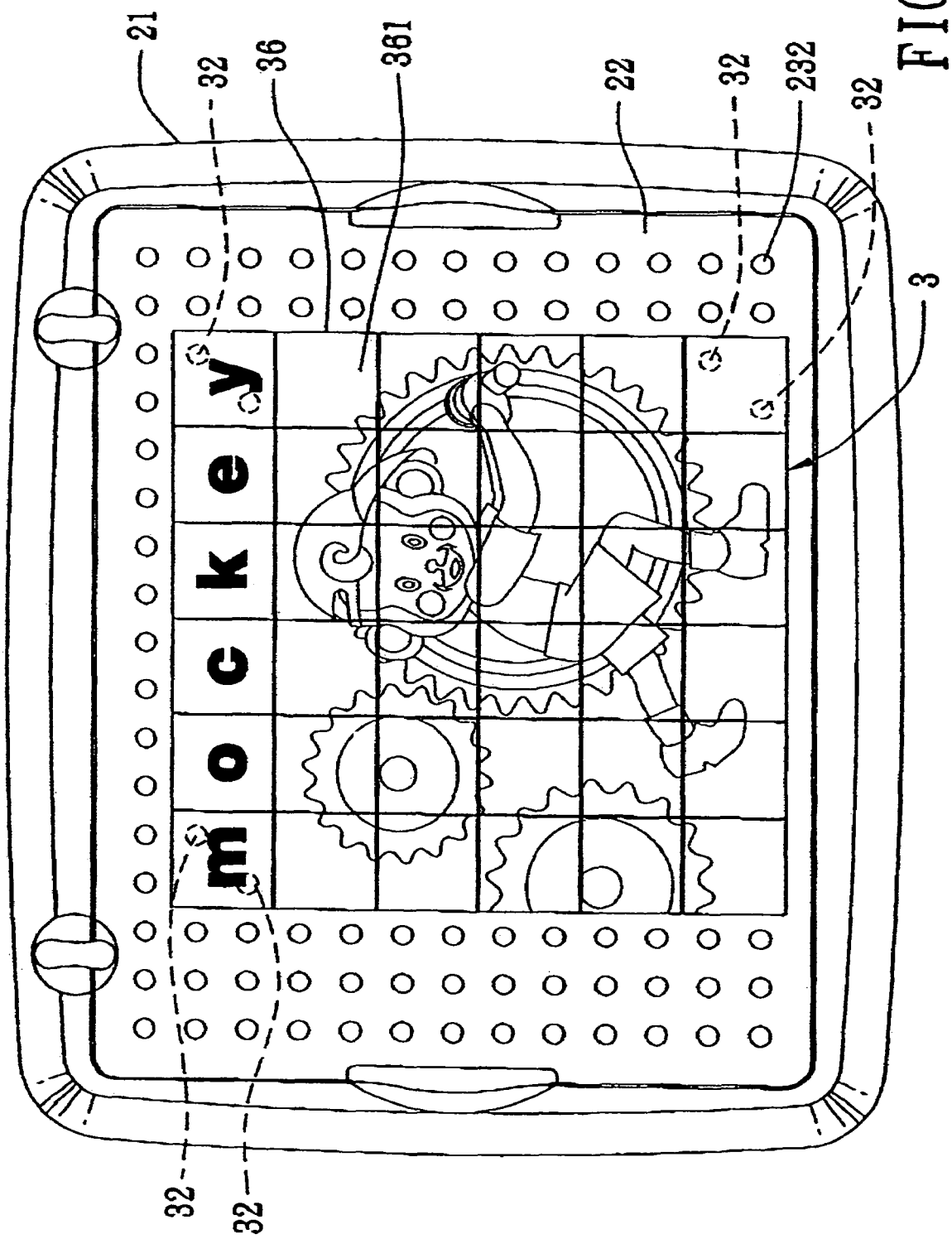
FIG. 10 is a plan view showing a third preferred embodiment of the learning toy according to the present invention, showing the attachment of a jigsaw puzzle board onto the board assembly.

A third preferred embodiment of the learning toy is shown in FIGS. 10 to 13. In this embodiment, the head of each toy element 3 is in the form of a board. The board may be a jigsaw puzzle board 36 (see FIG. 10), a writing board 37 (see FIG. 11), a support plate 39 for a combined basketball ring and net 393 (see FIG. 12), or a target board 30 (see FIG. 13). Referring to FIG. 10, the jigsaw puzzle board 36 is integrally formed with three pairs of stud members 32 on the three corners thereof, respectively, for insertion into corresponding aligned perforations 232,231 of the face panel 22 and of the base 21 for attachment onto the board assembly 2, and has a front side 361 provided with a pattern or picture formed by assembled jigsaw puzzle pieces.

Figure 11:
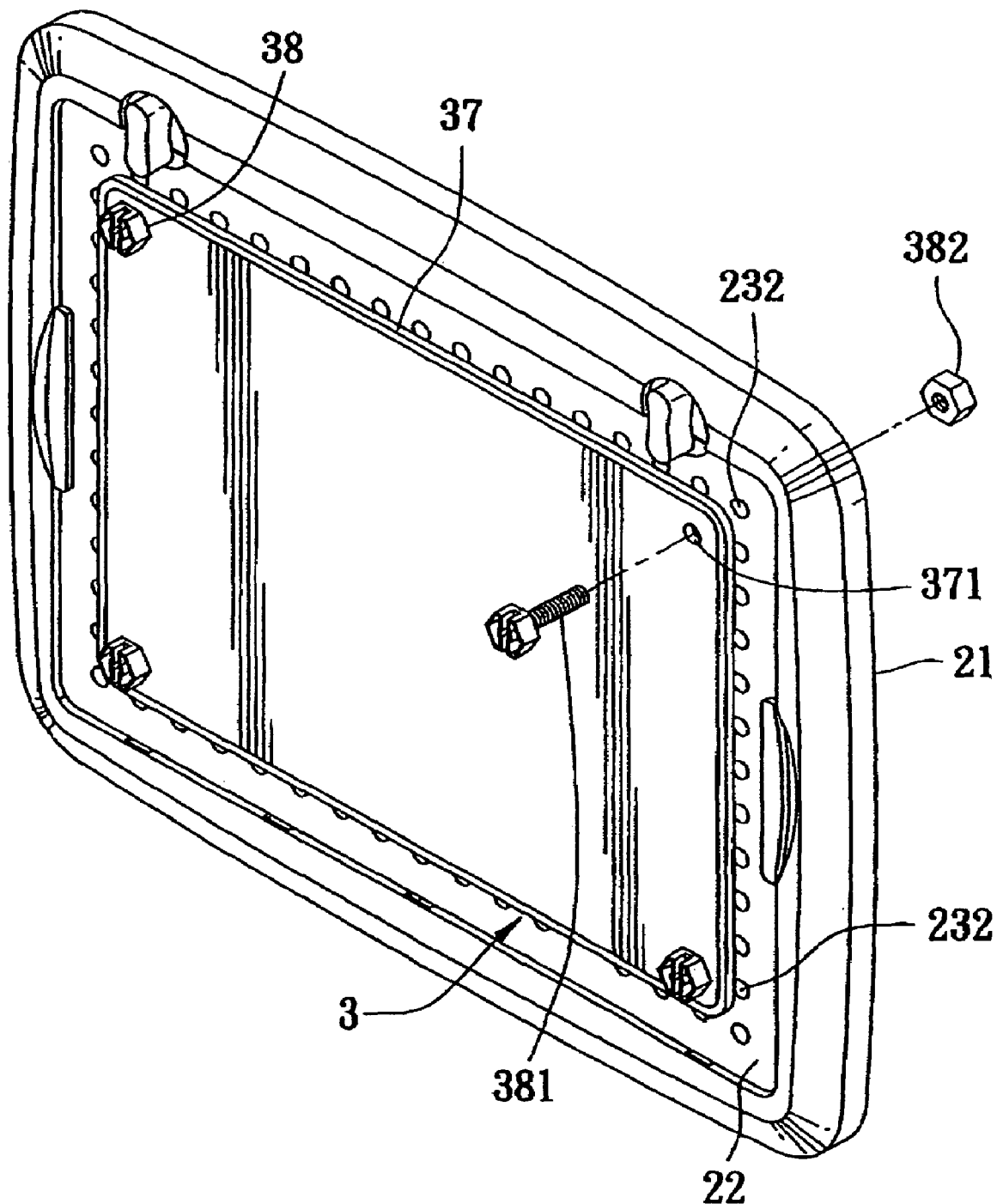
FIG. 11 is a perspective view of the third preferred embodiment, showing the attachment of a writing board onto the board assembly.

Referring to FIG. 11, the writing board 37 includes four through-holes 371 formed on the four corners thereof and four stud members 38 each formed with a thread portion 381. The writing board 37 is attached onto the board assembly 2 by inserting the stud members 38 into the respective through-holes 371 and respective perforations 232,231 of the face panel 22 and of the base 21 and then screwing into the respective nuts 382. The writing board 37 can be used for writing or drawing a picture with the user's hand.

Figure 12:
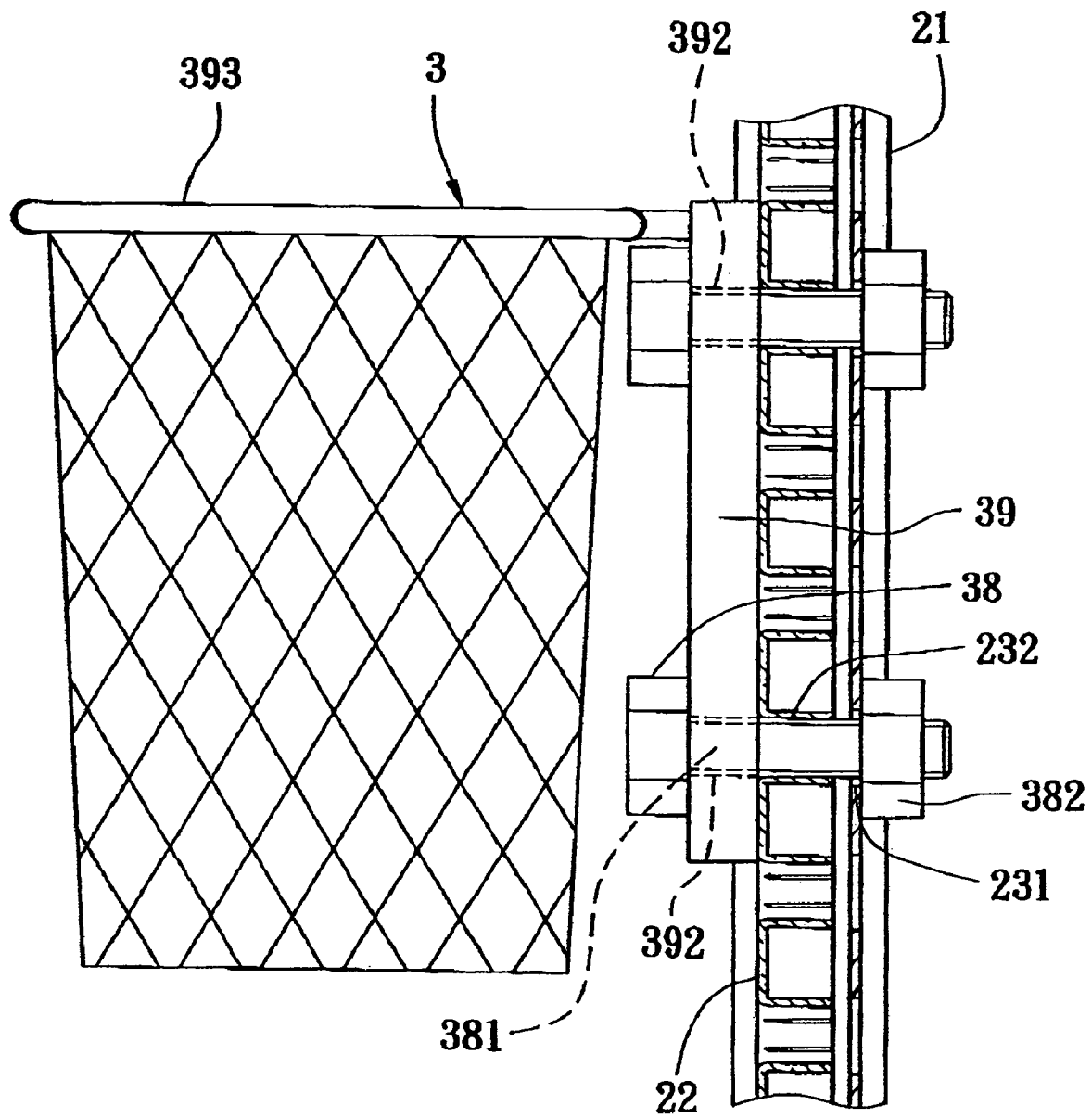
FIG. 12 is a sectional view of the third preferred embodiment, showing the attachment of a support plate holding a combined basketball ring and net onto the board assembly.

Referring to FIG. 12, the support plate 39 for a combined basketball ring and net 393 includes a plurality of through-holes 392 formed through the support plate 39. A plurality of stud members 38 each with a thread portion 381 are provided. To attach the support 39 holding the combined basketball ring and net 393 onto the board assembly 2, the stud members 38 are inserted into the respective through-holes 392 and the corresponding perforations 232,231 in the face panel 22 and in the base 21, and then threaded into respective nuts 382. A game of throwing and shooting the ball into the net can then be played.

Figure 13:
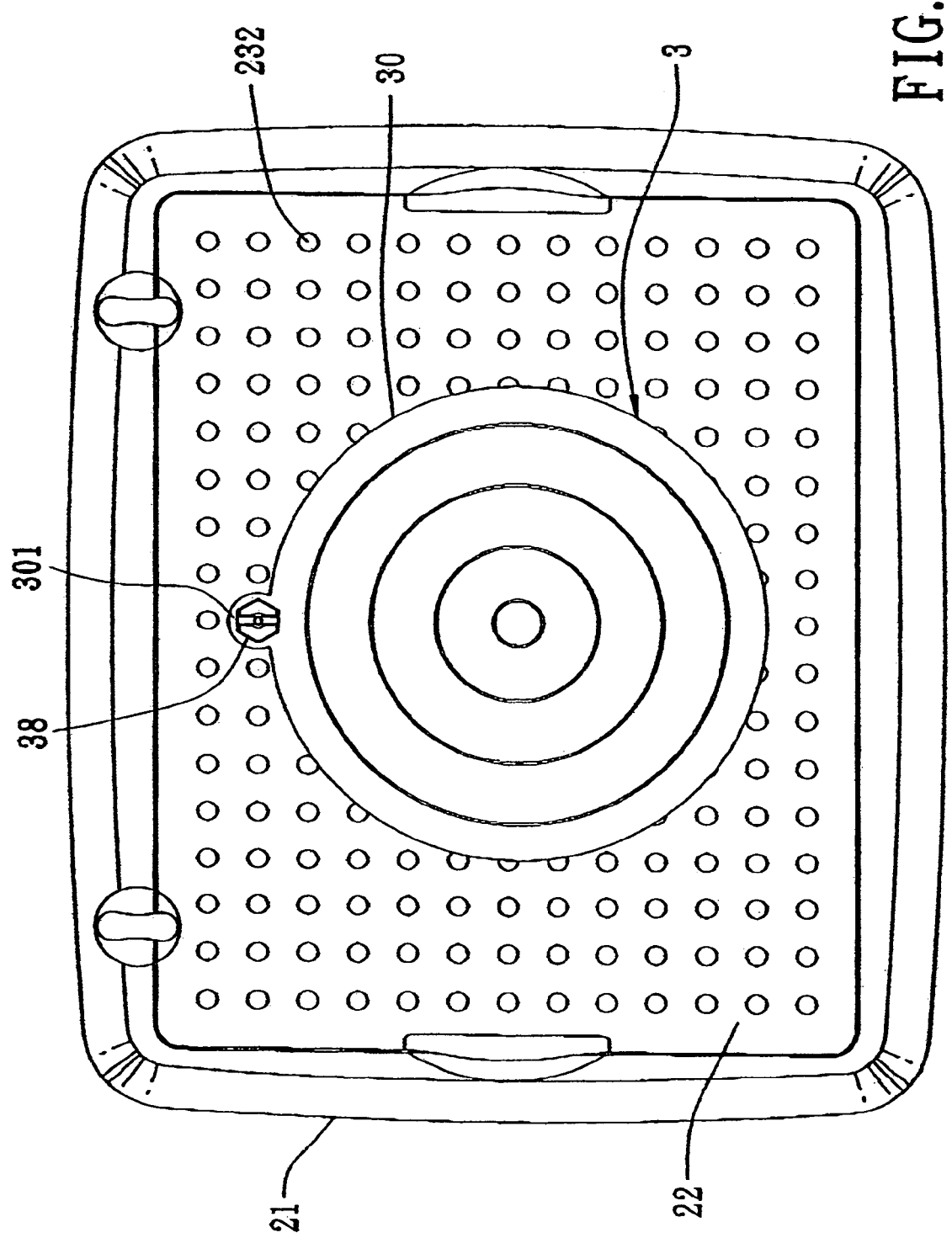
FIG. 13 is a plan view of the third preferred embodiment, showing the attachment of a target board onto the board assembly.

Referring to FIG. 13, the target board 30 includes a tab 301 with a through-hole (not shown). Similarly, a stud member 38 with the thread portion 381 (as shown in FIG. 11) is provided. To attach the target board 39 onto the board assembly 2, the stud member 38 is inserted into the through-hole of the lug 301 and one of the perforations 232,231 in the face panel 22 and in the base 21, and then threaded into the nut 382 (FIG. 11). The target board 30 provides for a game of shooting darts and the like.

Figure 14:
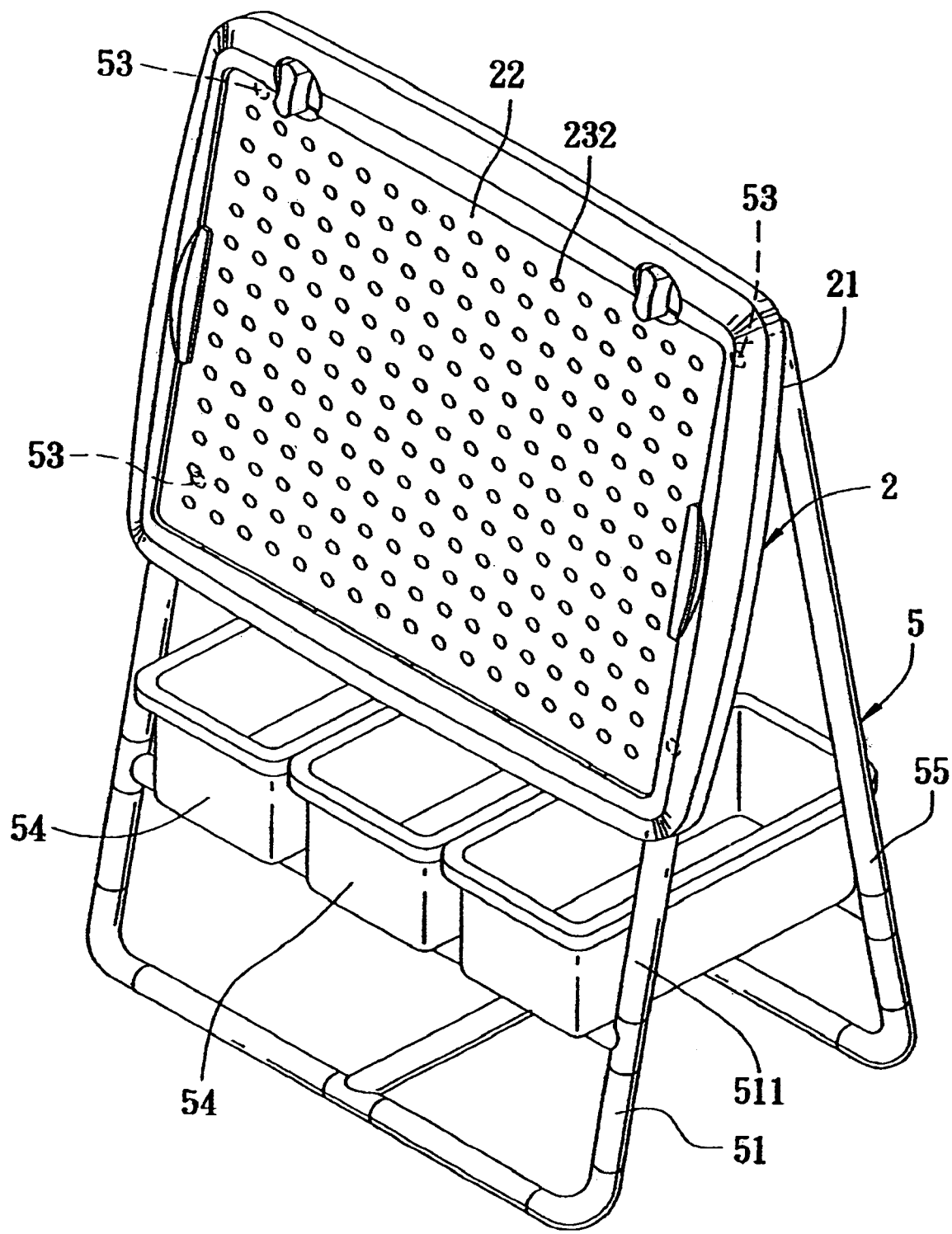
FIG. 14 is a perspective view showing the board assembly supported on a support frame assembly.
Figure 15:
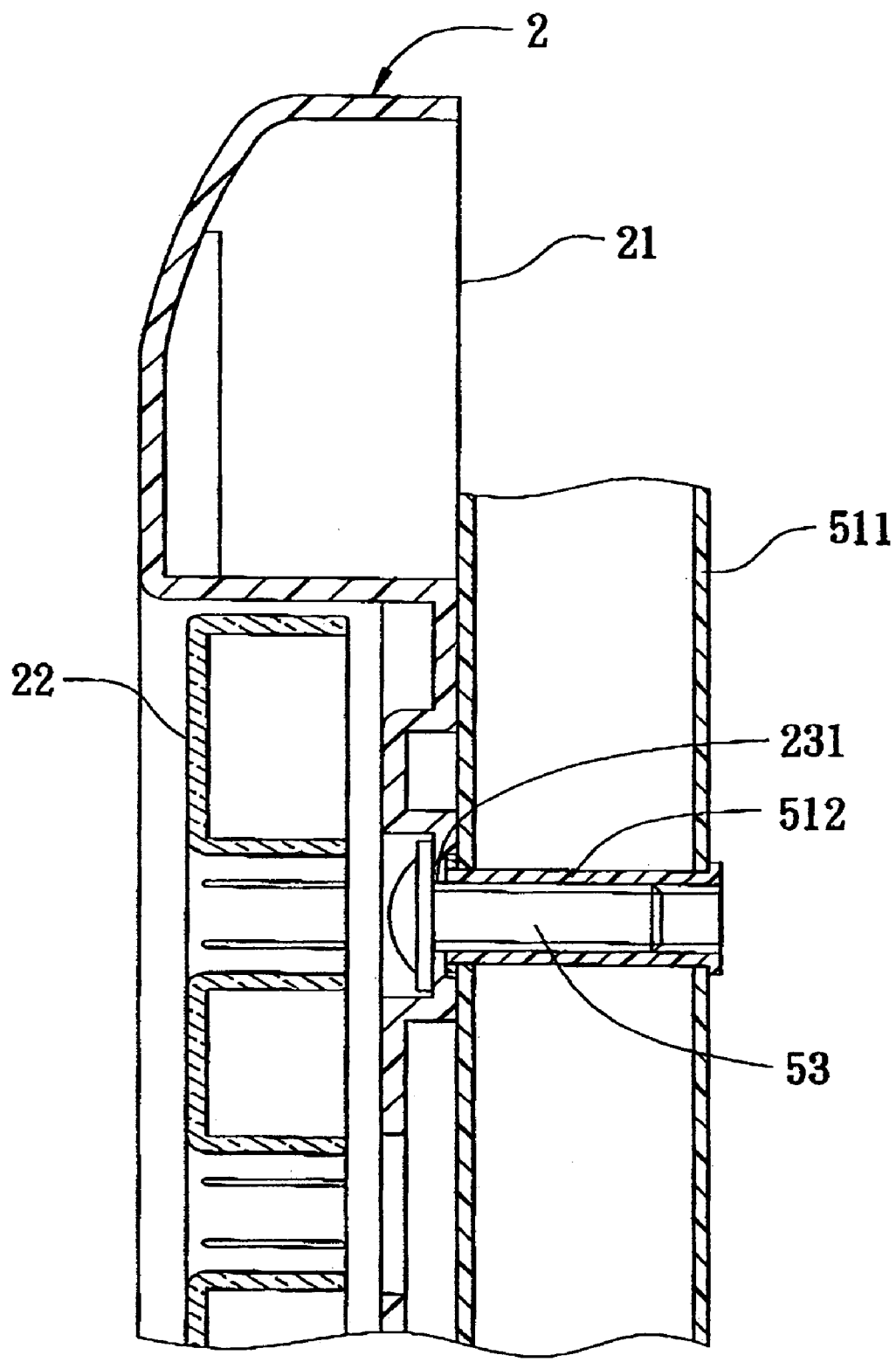
FIG. 15 is a fragmentary sectional view showing the attachment of the board assembly on the support frame assembly.

With reference to FIGS. 14 and 15, the learning toy of the present invention may be further provided with a support frame assembly 5 for ease of use or operation. The support frame assembly 5 includes a front frame 51 and a rear frame 55 that forms an angle with the front frame 51, and a fastening unit for fastening the board assembly 2 onto the front frame 51. Both front frame 51 and rear frame 55 are formed by a number of hollow posts 511. The fastening unit includes four screws 53 disposed at four corners of the board assembly 2. To mount the board assembly 2 onto the front frame 51, the screws 53 are inserted in the respective perforations 231 in the base 21 and then threaded into internally threaded tubes 512 formed in the hollow posts 511. The board assembly 2 is thus stably propped on the support frame assembly 5 for ease of use or operation.

Furthermore, a plurality of storage cases 54 may be mounted on the support frame assembly 5, for storing the toy elements 3.

In another aspect of the present invention, there is provided a toy-game kit which includes the board assembly 2 and the various toy elements 3 in the embodiments illustrated in FIGS. 3 to 13.

It can be appreciated from the foregoing that the learning toy as well as the toy-game kit according to the present invention have the following advantages and effects:

First of all, in the present invention, the face panel 22 is directly received in the recessed portion 212 of the base 21, with the projections 42 on the face panel 22 fitted in the respective slots 212 on the base 21, thus positioning the face panel 22. The fixing members 43 are then rotated to abut against the face panel 22, thus fixing the face panel 22 in place. The above operation is reversed to remove the face panel 22 from the base 21. Evidently, the positioning and removal of the face panel 22 are quite simple and easy.

Secondly, in the present invention, the board assembly 2 which is made up of the base 21 and the face panel 22 results in a thickness that provides for greater insertion depth of the various stud members 32,38 which are used to attach the heads of the toy elements 3 onto the board assembly 2. This enhances the stability and firmness of attachment so that variable configurations and sizes of the heads of the toy elements 3 may be attached onto the board assembly. As a result, numerous variations and different ways of playing are possible with the present invention. Thus, the games are not only made more interesting but can also train agility of the fingers of young children, stimulate brain power and arouse creativity in young children, as well as help young children develop independent thinking. The present invention is thus educational as well as recreational.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A toy-game kit comprising:
a board assembly, and a plurality of toy elements;
said board assembly including a base, a transparent face panel, and a pattern card;
said base having a front side, a back side, and a plurality of perforations extending through said front and back sides, said front side being recessed so as to form a recessed portion, a pair of opposite first walls, and a pair of opposite second walls, said first and second walls surrounding and projecting along a periphery of said recessed portion, said recessed portion having an area larger than that of said face panel and said pattern card and receiving removably said face panel and said pattern card;
said face panel having a surface substantially flush with said first and second walls;
said pattern card being disposed between said recessed portion and said face panel and having a pattern which can be viewed through said face panel;
each of said face panel and said pattern card having a plurality of perforations respectively aligned with said perforations of said base;
each of said toy elements having a head and a stud member that is connected to said head and that is insertable into one of said perforations of each of said base, said pattern card and said face panel so as to attach said head to said board assembly;
said base having at least one notched portion that is formed in one of said second walls and that is adapted to permit a finger to extend therein, at least one slot formed in one of said first walls, and at least one fixing member formed on the other one of said first walls;
said face panel having at least one projection formed thereon and being insertable with said slot, and at least one lug adapted to be held by a finger of the user, said lug projecting from said surface of said face panel in a direction substantially parallel to said surface and being extendable over said notched portion without engaging said notched portion;
said fixing member being rotatable to either project over or turn away from said face panel.

2. The toy-game kit according to claim 1, further comprising a support frame for propping said board assembly, and a fastening unit for fastening said board assembly to said support frame, said fastening unit including at least one fastener extendable through one of said perforations of said base and threadedly extending into said support frame.

3. The toy-game kit according to claim 1, further comprising a support plate, a threaded stud member, and a nut, said threaded stud member being extendable through said support plate and one of said perforations of each of said face panel, said pattern card and said base, said threaded stud member being engageable with said nut at said back side of said base so as to attach said support plate to said board assembly.

* * * * *